(12) United States Patent
Rogan (10) Patent No.: US 10,507,986 B2
(45) Date of Patent: Dec. 17, 2019

(54) APPARATUS AND METHOD FOR CLEANING A CONVEYOR BELT

(71) Applicant: General Mills, Inc., Minneapolis, MN (US)

(72) Inventor: Robert Rogan, Mason, OH (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 15/974,126

(22) Filed: May 8, 2018

(65) Prior Publication Data
US 2019/0344973 A1    Nov. 14, 2019

(51) Int. Cl.
| B65G 45/22 | (2006.01) |
|---|---|
| B65G 45/12 | (2006.01) |
| B65G 45/26 | (2006.01) |
| B65G 15/28 | (2006.01) |
| B65G 45/24 | (2006.01) |

(52) U.S. Cl.
CPC ............. *B65G 45/22* (2013.01); *B65G 15/28* (2013.01); *B65G 45/12* (2013.01); *B65G 45/24* (2013.01); *B65G 45/26* (2013.01); *B65G 2812/02118* (2013.01)

(58) Field of Classification Search
CPC ......... B65G 45/22; B65G 45/24; B65G 45/26
USPC .................................................. 198/495, 617
See application file for complete search history.

(56) References Cited

U.S. PATENT DOCUMENTS

| 1,793,246 | A | | 2/1931 | Philips | |
|---|---|---|---|---|---|
| 3,680,684 | A | | 8/1972 | Purdy et al. | |
| 4,087,320 | A | * | 5/1978 | Danahy | B65G 45/22 134/122 R |
| 5,031,750 | A | * | 7/1991 | Barnes | B65G 45/22 198/495 |
| 5,355,992 | A | | 10/1994 | Baig et al. | |
| 5,649,616 | A | * | 7/1997 | Stecklow | B65G 45/24 198/495 |
| 5,669,482 | A | * | 9/1997 | Mojden | B65G 15/58 198/380 |

(Continued)

FOREIGN PATENT DOCUMENTS

| AU | 2003213497 | 2/2004 |
|---|---|---|
| CN | 201012856 | 1/2008 |

(Continued)

*Primary Examiner* — Joseph A Dillon, Jr.
(74) *Attorney, Agent, or Firm* — Diederiks & Whitelaw, PLC; Gregory P. Kaihoi, Esq.

(57) ABSTRACT

A cleaning apparatus includes a roller, a conveyor belt and a belt cleaner. The conveyor belt transports food material in a first direction, and the belt cleaner cleans the food material from the conveyor belt as the conveyor belt travels in a second direction, distinct from the first direction. The conveyor belt passes around the roller as the conveyor belt changes from traveling in the first direction to traveling in the second direction. At least a portion of the belt cleaner is located directly below the roller such that food material falling off the conveyor belt when the conveyor belt passes around the roller is caught by the belt cleaner. The belt cleaner includes an enclosure through which the conveyor belt passes and an air nozzle located within the enclosure. The air nozzle directs air onto the underside of the conveyor belt. Preferably, the air nozzle is an air knife, which generates a sheet of air.

24 Claims, 6 Drawing Sheets

(56) References Cited

U.S. PATENT DOCUMENTS

| | | | |
|---|---|---|---|
| 6,035,996 | A | 3/2000 | Swift |
| 6,206,175 | B1 | 3/2001 | Tschantz |
| 7,234,586 | B1 | 6/2007 | Newman |
| 7,882,959 | B1 | 2/2011 | Augst |
| 8,056,699 | B2 | 11/2011 | Depot et al. |
| 9,032,976 | B2 | 5/2015 | Berntsen et al. |
| 9,199,280 | B2 | 12/2015 | Viny |
| 2005/0109580 | A1* | 5/2005 | Thompson ............ B65G 45/22 198/495 |
| 2010/0139709 | A1* | 6/2010 | Saefkow ................ B65B 55/10 134/32 |
| 2013/0042889 | A1* | 2/2013 | White .................... B08B 5/026 134/15 |
| 2016/0090245 | A1* | 3/2016 | Moor .................... B65G 45/14 198/498 |

FOREIGN PATENT DOCUMENTS

| | | |
|---|---|---|
| CN | 201402034 | 2/2010 |
| CN | 102974154 | 3/2013 |
| CN | 103706601 | 4/2014 |
| CN | 103879744 | 6/2014 |
| CN | 203845391 | 9/2014 |
| CN | 204310431 | 5/2015 |
| CN | 204473787 | 7/2015 |
| CN | 205289080 | 6/2016 |
| CN | 105744710 | 7/2016 |
| JP | 2010234579 | 10/2010 |
| KR | 101007228 | 1/2011 |

* cited by examiner

APPARATUS AND METHOD FOR CLEANING A CONVEYOR BELT

BACKGROUND OF THE INVENTION

The present invention pertains to conveyor systems and, more particularly, to the cleaning of conveyor systems used in food production applications.

When producing food products on a commercial scale, the food products are often transported around a factory using a conveyor system. Such conveyor systems frequently include one or more conveyor belts. When transporting food products prior to packaging, the food products sometimes leave dust, crumbs or other residue behind on the conveyor belts. This is particularly true in the cereal production industry. Because the conveyor belts recirculate around rollers, any particles remaining on a conveyor belt when the conveyor belt changes directions will fall from the conveyor belt. As little as 1/32 of an inch of dust on a floor can create a hazardous work environment. Accordingly, the areas below the conveyor belts need to be cleaned regularly. In view of the above, it would be desirable to be able to prevent dust, crumbs or other residue left behind on conveyor belts from accumulating below the conveyor belts.

SUMMARY OF THE INVENTION

In view of the above, the present invention provides an apparatus and method for cleaning conveyor belts. Specifically, a conveyor belt transports food material in a first direction, and a belt cleaner is positioned to clean the food material from the conveyor belt as the conveyor belt travels in a second, return direction, distinct from the first direction. The belt cleaner includes an enclosure through which the conveyor belt passes and an air nozzle located within the enclosure. The air nozzle directs air onto the conveyor belt. Preferably, the air nozzle is an air knife, which generates a sheet of air. In some embodiments, the air knife directs air in the first direction, and the second direction is opposite the first direction.

The conveyor belt passes around a roller as the conveyor belt changes from traveling in the first direction to traveling in the second direction. At least a portion of the enclosure is located directly below the roller such that residual food material falling off the conveyor belt when the conveyor belt passes around the roller is directed into the enclosure.

Preferably, the belt cleaner further includes a first baffle located within the enclosure below the conveyor belt. The enclosure has an entrance through which the conveyor belt enters and an exit through which the conveyor belt exits. The first baffle is located between the air nozzle and the entrance. The air nozzle directs air toward the first baffle, and the first baffle redirects airflow from the air nozzle toward an outlet at the bottom of the enclosure. The enclosure has a funnel extending upward from the outlet.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
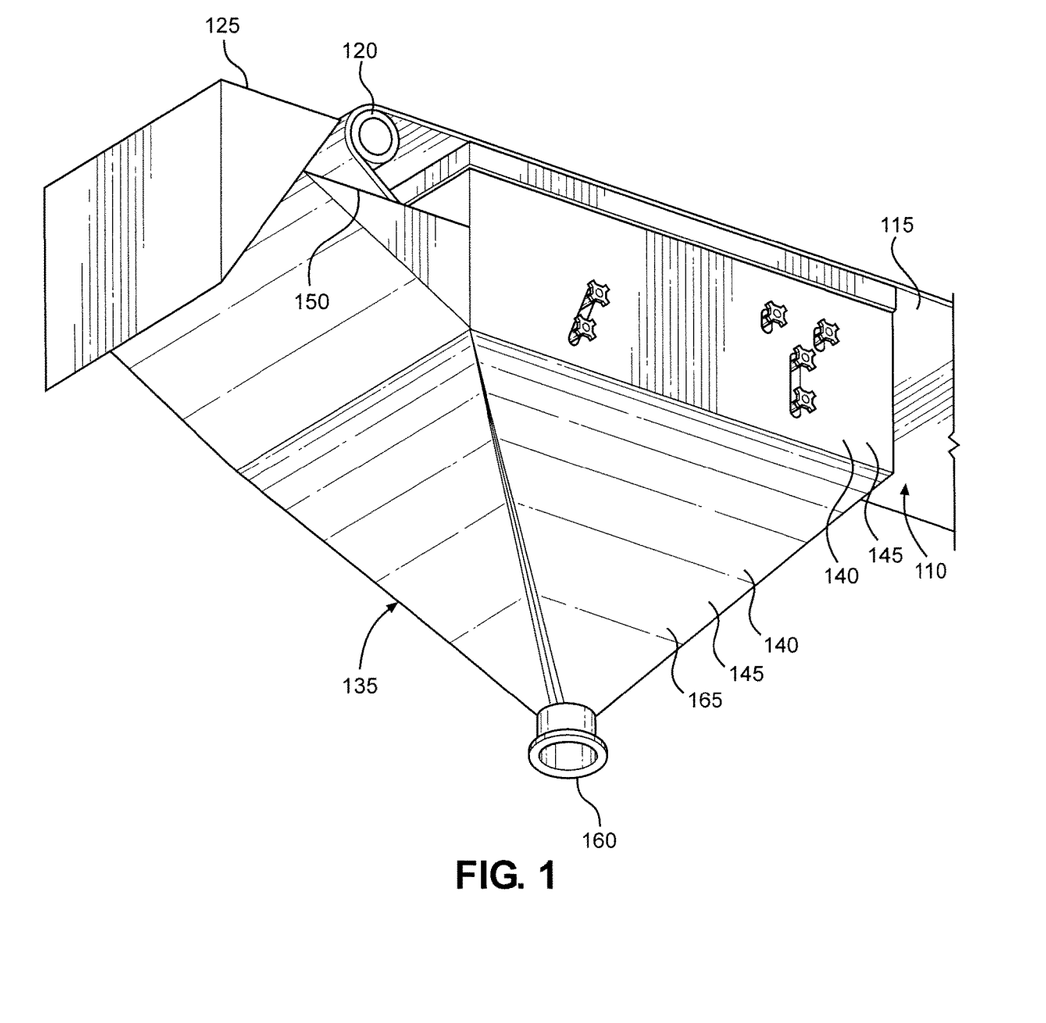
FIG. 1 is a perspective view of a portion of a production line constructed in accordance with the present invention.
Figure 2:
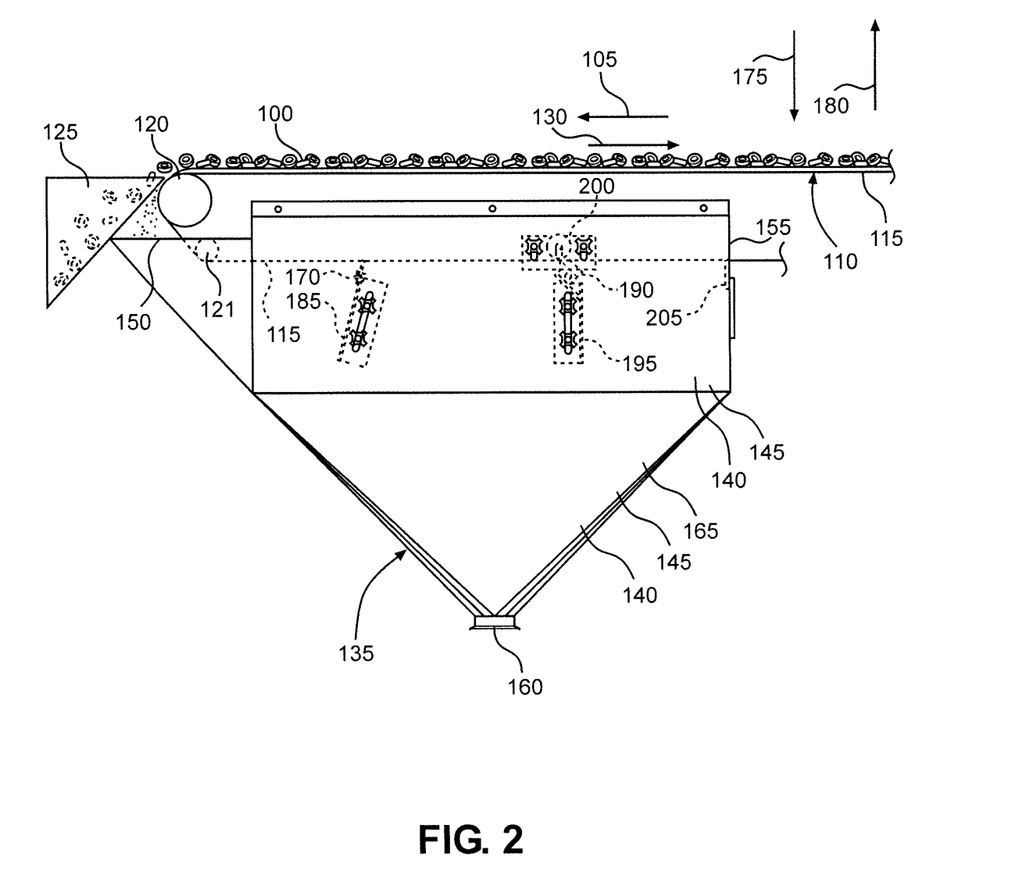
FIG. 2 is a side view of the portion of the production line shown in FIG. 1.

With initial reference to FIGS. 1 and 2, there is shown a portion of a production line, for producing food products, constructed in accordance with the present invention. Specifically, FIG. 2 shows food material 100 being transported in a direction 105 by a conveyor system 110. At this point in the process, food material 100 is loose, i.e., unpackaged. For example, food material 100 can comprise a plurality of cereal pieces for a ready-to-eat cereal product. However, the specific type of food material can vary.

As food material 100 is transported by conveyor system 110, food material 100 leaves dust, crumbs or other residue behind on conveyor system 110. In particular, this residue is left behind on a conveyor belt 115 of conveyor system 110. Conveyor belt 115 supports food material 100 as food material 100 is transported. Conveyor system 110 also includes a plurality of rollers around which conveyor belt 115 travels. Specifically, in FIG. 2, a return roller is labeled 120, and an idler roller is labeled 121. Conveyor belt 115 transports food material 100 to a chute 125 of conveyor system 110, and chute 125 carries food material 100 to further machinery or another conveyor unit (not shown). At the point at which conveyor belt 115 meets chute 125, conveyor belt 115 passes around roller 120 and changes directions. Conveyor belt 115 is now traveling in a direction 130, opposite direction 105, and no longer carrying food material 100. However, some residue from food material 100 remains on conveyor belt 115.

To clean the residue from conveyor belt 115, a belt cleaner 135 is provided. At least a portion of belt cleaner 135 is located directly below roller 120 such that any residue that falls off conveyor belt 115, due to gravity, when conveyor belt 115 passes around roller 120 is caught by belt cleaner 135. Belt cleaner 135 includes a plurality of walls 140, which together define an enclosure 145 through which conveyor belt 115 passes while traveling in direction 130. Specifically, conveyor belt 115 enters enclosure 145 through an entrance 150 and exits enclosure 145 through an exit 155. Enclosure 145 has an outlet 160 at a bottom of enclosure 145 through which residue from food material 100 passes to exit enclosure 145. Enclosure 145 also has a funnel 165 extending upward from outlet 160. Funnel 165 is configured to guide the residue to outlet 160 by funneling toward outlet 160. Preferably, the residue slowly falls through enclosure 145 and exits through outlet 160 at a rate of 1-2 cubic feet per minute (0.03-0.06 cubic meters per minute).

Belt cleaner 135 further includes a belt scraper 170 located within enclosure 145 and configured to scrape residue from conveyor belt 115. In particular, belt scraper 170 scrapes residue from the underside of conveyor belt 115. For purposes of the present invention, the "underside" of a conveyor belt is the portion of the conveyor belt whose outer surface currently faces downward (i.e., in a direction 175). Of course, it should be recognized that, due to movement of the conveyor belt around rollers, this portion of the conveyor belt surface previously faced upward (i.e., in a direction 180) and had deposited thereon the residue. The portion of the conveyor belt currently facing upward is considered the "upper side" of the conveyor belt.

Belt scraper 170 is coupled to and supported within enclosure 145 by a baffle 185. As such, baffle 185 acts as a bracket for belt scraper 170. Also, baffle 185 is configured to redirect airflow within enclosure 145, as will be discussed below. Preferably, baffle 185 is configured such that the position of belt scraper 170 is adjustable.

Belt cleaner 135 additionally includes an air nozzle 190 located within enclosure 145. In the embodiment illustrated, air nozzle 190 is in the form of an elongated air knife. However, other types of air nozzles can be used in accordance with the present invention. As will be detailed further below, air knife 190 is configured to receive compressed air through an inlet, generate a sheet of air and direct this airflow onto the underside of conveyor belt 115. The sheet of air contacts conveyor belt 115 at an angle and then travels along the underside of conveyor belt in direction 105. As a result, any residue remaining on conveyor belt 115 from food material 100 is blown off of conveyor belt 115. The airflow generated by air knife 190 continues traveling in direction 105 until reaching baffle 185, at which point baffle 185 redirects the airflow downward toward outlet 160 so that the airflow can carry the residue out of enclosure 145 to a waste receptacle (not shown). Conveyor belt 115 is clean upon exiting belt cleaner 135. Since belt cleaner 135 extends vertically below roller 120 (as well as beyond roller 120 in direction 105), funnel 165 also catches any residue that falls off conveyor belt 115 as conveyor belt 115 changes directions and enters belt cleaner 135. Therefore, with this overall arrangement, belt cleaner 135 prevents residue from accumulating below conveyor belt 115 (other than in belt cleaner 135 or the waste receptacle).

Air knife 190 is coupled to and supported within enclosure 145 by a baffle 195. As such, baffle 195 acts as a bracket for air knife 190. Preferably, baffle 195 is configured such that the position of air knife 190 is adjustable. In addition, like baffle 185, baffle 195 is configured to redirect airflow within enclosure 145 toward outlet 160. In one embodiment, air knife 190 is the Super Air Knife from EXAIR®. A roller 200 is located immediately across conveyor belt 115 from air knife 190 to maintain conveyor belt 115 in a position adjacent to air knife 190.

Belt cleaner 135 further includes a discharge baffle 205 located adjacent to exit 155 of enclosure 145. Preferably, the position of baffle 205 is adjustable. In addition, like baffles 185 and 195, baffle 205 is configured to help direct airflow within enclosure 145 toward outlet 160. Overall, the arrangement of baffles 185, 195 and 205, the shape of funnel 165 and the angle of air knife 190 work together to direct the airflow generated within enclosure 145 by air knife 190 (as well as the residue entrained in this airflow) out through outlet 160 without any need for a suction system.

Figure 3:
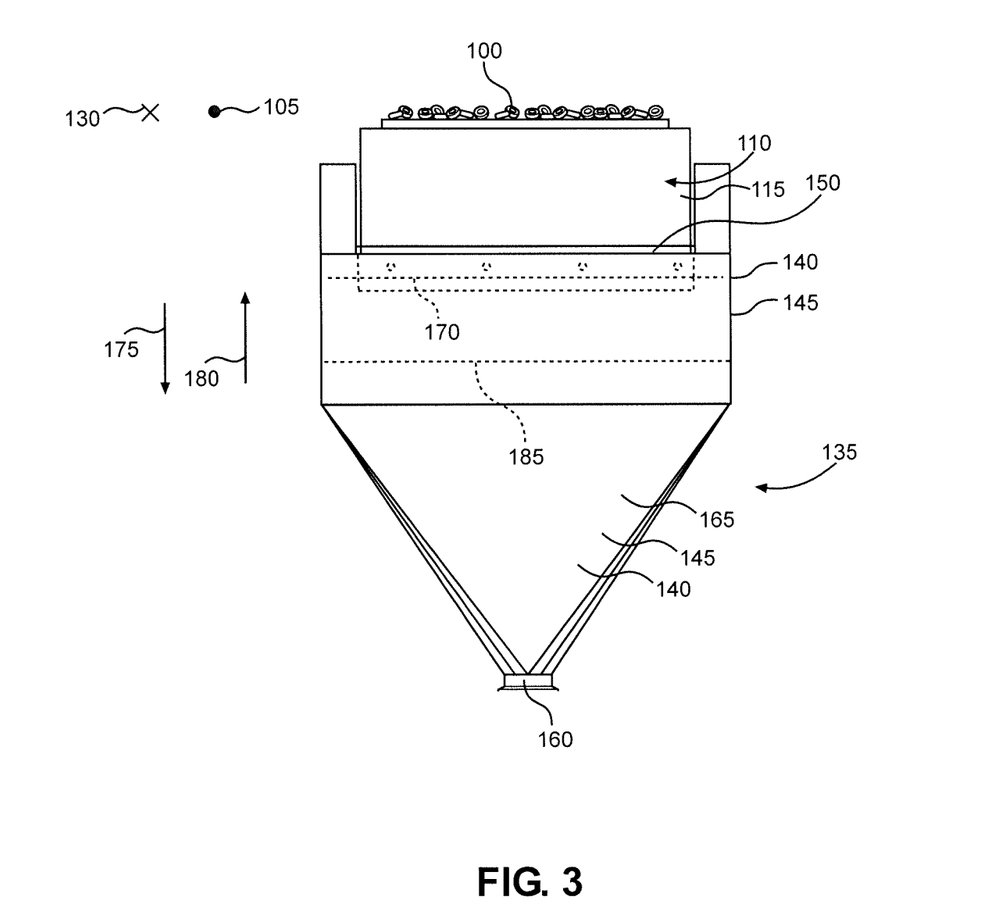
FIG. 3 is an end view of a belt cleaner constructed in accordance with the present invention.
Figure 4:
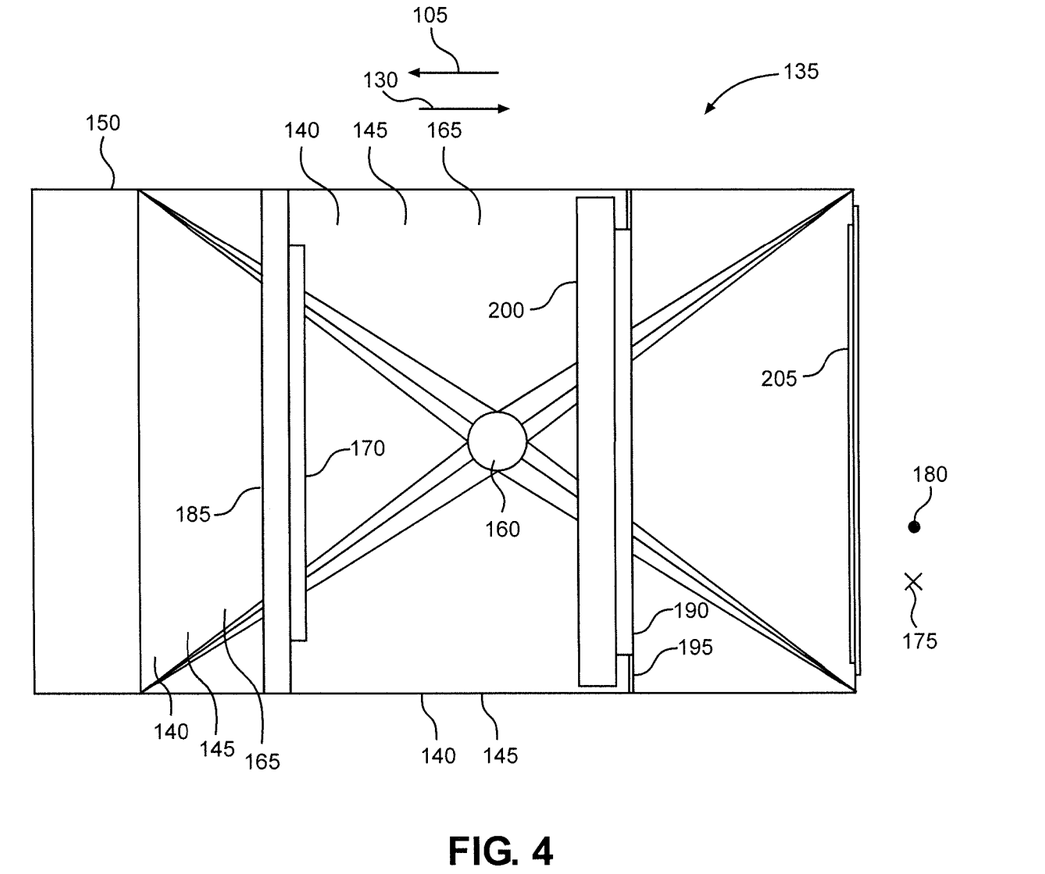
FIG. 4 is a top view of the belt cleaner.

Turning to FIG. 3, an end view of belt cleaner 135 is provided. This view helps show that conveyor belt 115, belt scraper 170 and baffle 185 extend across the width of enclosure 145. FIG. 4 is a top view of belt cleaner 135 and helps show that air knife 190, baffle 195, roller 200 and baffle 205 also extend across the width of enclosure 145.

Figure 5:
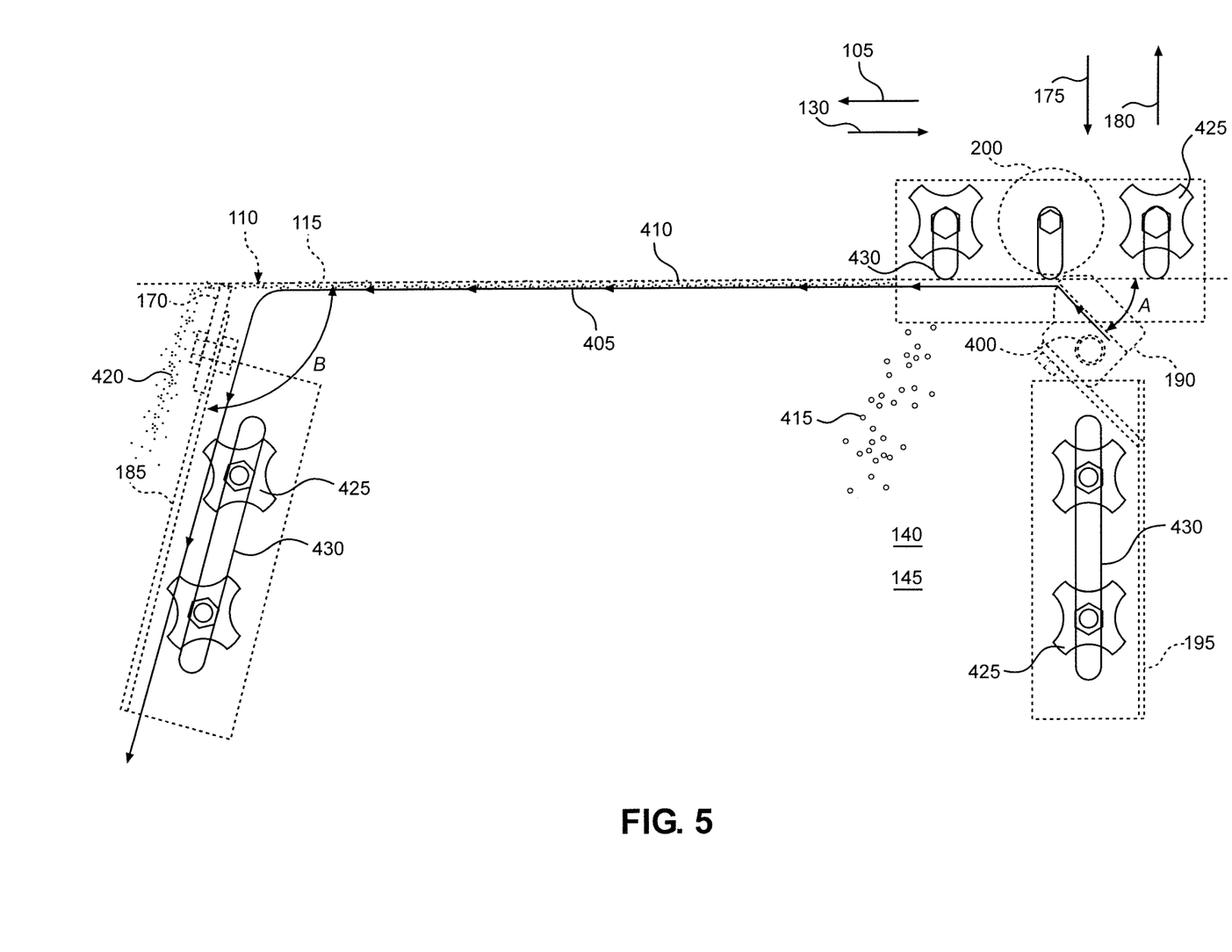
FIG. 5 is an enlarged view of a portion of FIG. 2.

With reference now to FIG. 5, there is shown an enlarged view of a portion of FIG. 2. Air knife 190 receives compressed air through an inlet 400 and generates a sheet of air 405. Air knife 190 directs sheet 405 onto the underside of conveyor belt 115. Sheet 405 then travels along conveyor belt 115 in direction 105 until contacting baffle 185, whereupon the air is re-directed downward toward outlet 160. During this process, lighter particles of residue from food material 100 are picked up and carried by sheet 405, while heavier particles simply fall downward toward outlet 160 (i.e., in direction 175). Some lighter particles 410 and heavier particles 415 are shown in FIG. 5 for illustration purposes. In addition, as discussed above, residue from food material 100 is scraped off of conveyor belt 115 by belt scraper 170. To illustrate this, particles 420 are shown in FIG. 5.

Preferably, air knife 190 is configured such that the angle between sheet 405 and conveyor belt 115 is acute at the point where sheet 405 contacts conveyor belt 115 (shown as angle A in FIG. 5). In one embodiment, air knife is configured such that this angle is in the range of 40-50°. Preferably, baffle 185 is configured such that the angle between conveyor belt 115 and baffle 185 is obtuse (shown as angle B in FIG. 5).

As noted above, the positions of belt scraper 170 and air knife 190 are preferably adjustable. To accomplish this, baffles 185 and 195 are adjusted using handles 425 and slots 430. Specifically, turning handles 425 in one direction loosens the connection between baffles 185 and 195 and enclosure 145, allowing baffles 185 and 195 to be moved relative to enclosure 145 by sliding handles 425 within slots 430. Turning handles 425 in the opposite direction tightens the connection between baffles 185 and 195 and enclosure 145 to prevent movement of baffles 185 and 195 relative to enclosure 145. Since belt scraper 170 and air knife 190 are coupled to baffles 185 and 195, respectively, movement of baffles 185 and 195 results in movement of belt scraper 170 and air knife 190. Similarly, the position of roller 200 can be adjusted using handles 425 and slots 430. The position of baffle 205 can be adjusted in the same manner, although the corresponding handles and slots are not shown in the drawings. The positions of belt scraper 170, air knife 190, roller 200 and baffle 205 are independently adjustable using the corresponding handles 425.

Figure 6:
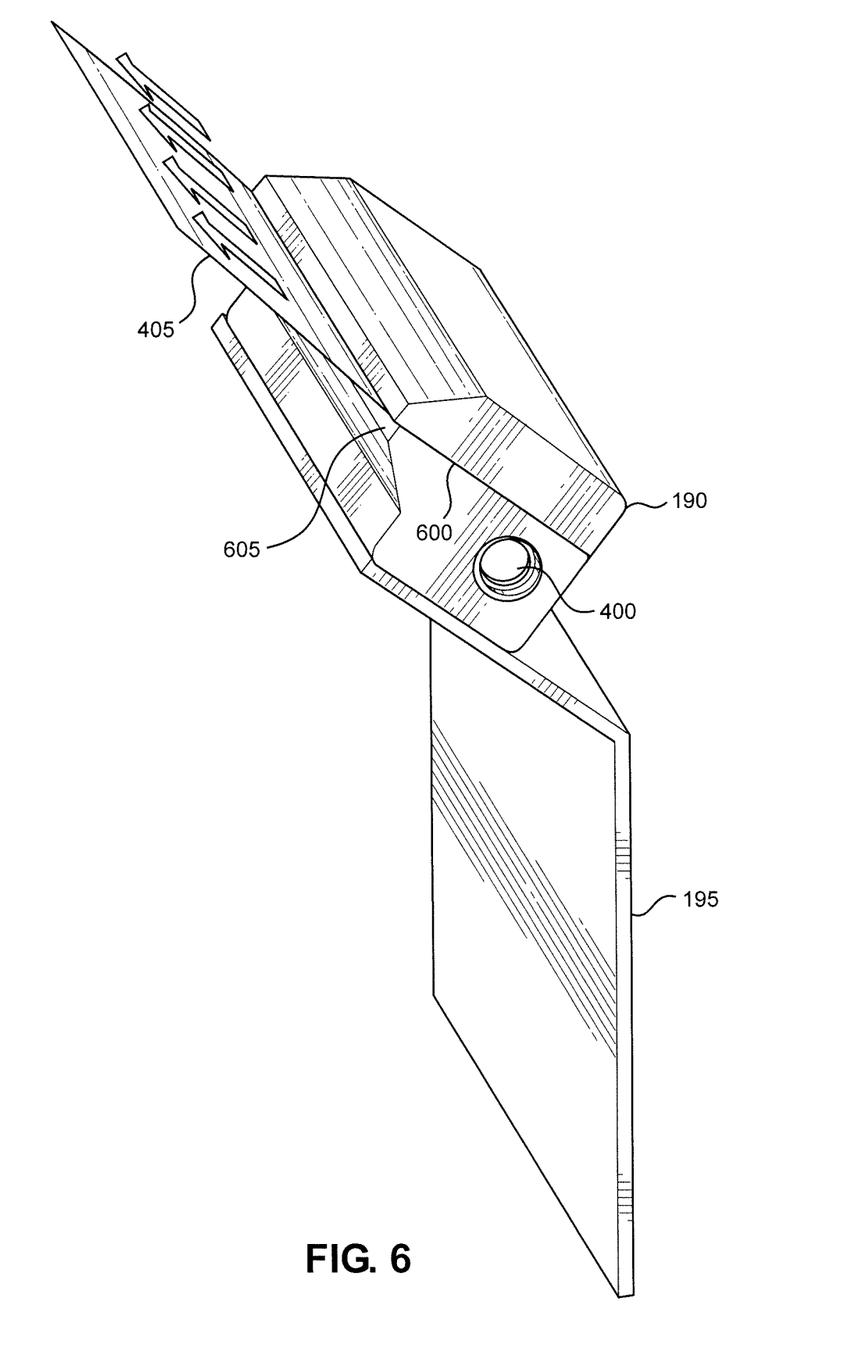
FIG. 6 is a perspective view of an air knife and baffle of the belt cleaner.

FIG. 6 is a perspective view of air knife 190 and baffle 195. This view helps highlight the shape of sheet 405, which is preferably a uniform sheet of laminar airflow. Sheet 405 is generated within air knife 190 as air, entering through inlet 400, contacts a wall 600 and is directed by wall 600 to an outlet 605. To create the desired uniform sheet of air, each of wall 600 and outlet 605 preferably extends along substantially the entire length of air knife 190, as in the embodiment illustrated. Sheet 405 exits air knife 190 through outlet 605 and entrains the air adjacent to air knife 190. Preferably, air knife 190 is configured such that air is entrained at a ratio in the range of 30:1 to 40:1 (entrained air:compressed air). Accordingly, less compressed air is needed for a given amount of force to be imparted to conveyor belt 115 by air knife 190. This reduces the amount of energy used by belt cleaner 135. In one embodiment, the pressure of the air at outlet 605 is only 20 pound-force per square inch (140,000 Pascals) prior to entrainment of the surrounding air. Preferably, the efficiency of air knife 190 is also increased using the Venturi effect. That is, air knife 190 is designed such that outlet 605 represents a constriction in the flow path of air through air knife 190, thereby increasing the velocity of the air as it passes through outlet 605. As a result of this overall arrangement, the present invention is much more energy efficient than the large vacuum systems sometimes used in the art. While such systems can be effective, their energy usage makes them undesirable. The only energy required by the present invention is a small amount of compressed air.

Based on the above, it should be readily apparent that the present invention provides a way to prevent dust, crumbs or other residue left behind on a conveyor belt from accumulating below the conveyor belt. While certain preferred embodiments of the present invention have been set forth, it should be understood that various changes or modifications could be made without departing from the spirit of the present invention. In general, the invention is only intended to be limited by the scope of the following claims.

The invention claimed is:

1. A cleaning apparatus comprising:
   a roller;
   a conveyor belt configured to extend around the roller and transport food material in a first direction; and
   a belt cleaner configured to clean residue food material from the conveyor belt as the conveyor belt travels in a second direction, distinct from the first direction, wherein the cleaning apparatus is configured such that the conveyor belt passes around the roller as the conveyor belt changes from traveling in the first direction to traveling in the second direction, said belt cleaner including:
      an enclosure through which the conveyor belt passes, wherein at least a portion of the enclosure is located directly below the roller such that the residue food material falling off the conveyor belt when the conveyor belt passes around the roller is directed into the enclosure, and the enclosure has an outlet at a bottom of the enclosure through which the residue food material passes to exit the enclosure;
      an air nozzle located within the enclosure and configured to direct air onto the underside of the conveyor belt in further removing the residue food material from the belt; and
      a first baffle located within the enclosure below the conveyor belt.

2. The cleaning apparatus of claim 1, wherein the air nozzle is an air knife, and the air knife is configured to generate a sheet of air.

3. The cleaning apparatus of claim 2, wherein the air knife is configured to direct air in the first direction.

4. The cleaning apparatus of claim 3, wherein the second direction is opposite the first direction.

5. The cleaning apparatus of claim 1, wherein the belt cleaner further includes a second baffle located within the enclosure below the conveyor belt.

6. The cleaning apparatus of claim 1, wherein the belt cleaner further includes a belt scraper coupled to the first baffle, and the belt scraper is configured to scrape the residue food material from the underside of the conveyor belt.

7. The cleaning apparatus of claim 5, wherein the air nozzle is coupled to the second baffle, and the second baffle is configured to support the air nozzle within the enclosure.

8. The cleaning apparatus of claim 5, wherein the enclosure has an entrance through which the conveyor belt enters and an exit through which the conveyor belt exits, and the belt cleaner further includes a third baffle located adjacent the exit.

9. The A cleaning apparatus of claim 5, comprising:
   a roller;
   a conveyor belt configured to extend around the roller and transport food material in a first direction; and
   a belt cleaner configured to clean residue food material from the conveyor belt as the conveyor belt travels in a second direction, distinct from the first direction, wherein the cleaning apparatus is configured such that the conveyor belt passes around the roller as the conveyor belt changes from traveling in the first direction to traveling in the second direction, said belt cleaner including:
      an enclosure through which the conveyor belt passes, wherein at least a portion of the enclosure is located directly below the roller such that the residue food material falling off the conveyor belt when the conveyor belt passes around the roller is directed into the enclosure, and the enclosure has an entrance through which the conveyor belt enters and an exit through which the conveyor belt exits;
      an air nozzle located within the enclosure and configured to direct air onto the underside of the conveyor belt in further removing the residue food material from the belt; and
      a first baffle located within the enclosure below the conveyor belt, wherein the first baffle is located between the air nozzle and the entrance, and the air nozzle is configured to direct air toward the first baffle.

10. The cleaning apparatus of claim 1, wherein the first baffle is configured to redirect airflow from the air nozzle toward the outlet.

11. The cleaning apparatus of claim 1, wherein the enclosure has a funnel extending upward from the outlet.

12. A method of cleaning with a cleaning apparatus comprising a roller, a conveyor belt configured to extend around the roller and a belt cleaner including an enclosure through which the conveyor belt passes, an air nozzle located within the enclosure and a first baffle located within the enclosure below the conveyor belt, and wherein the enclosure has an outlet at a bottom of the enclosure, the method comprising:
   transporting food material in a first direction with the conveyor belt;
   directing the conveyor belt to pass around the roller such that the conveyor belt changes from traveling in the first direction to traveling in a second direction, distinct from the first direction;
   cleaning residue food material from the conveyor belt with the belt cleaner as the conveyor belt travels in the second direction, wherein cleaning the residue food material from the conveyor belt includes:
      catching the residue food material falling off the conveyor belt when the conveyor belt passes around the roller in at least a portion of the enclosure located directly below the roller; and
      causing the conveyor belt to pass through the enclosure in which air is directed onto an underside of the conveyor belt with the air nozzle in further removing the residue food material from the conveyor belt; and
      causing the residue food material to pass through the outlet to exit the enclosure.

13. The method of claim 12, wherein the air nozzle is an air knife, and cleaning the residue food material from the conveyor belt further includes generating a sheet of air with the air knife.

14. The method of claim 13, wherein directing air onto the underside of the conveyor belt includes directing air in the first direction with the air knife.

15. The method of claim 14, wherein the second direction is opposite the first direction.

16. The method of claim 12, further comprising redirecting airflow from the air nozzle with the first baffle.

17. The method of claim 16, wherein the belt cleaner further includes a second baffle located within the enclosure below the conveyor belt, the method further comprising redirecting airflow from the air nozzle with the second baffle.

18. The method of claim 16, wherein the belt cleaner further includes a belt scraper coupled to the first baffle, and cleaning the residue food material from the conveyor belt further includes scraping the residue food material from the underside of the conveyor belt with the belt scraper.

19. The method of claim 17, wherein the air nozzle is coupled to the second baffle, the method further comprising supporting the air nozzle within the enclosure with the second baffle.

20. The method of claim 17, wherein the enclosure has an entrance and an exit, causing the conveyor belt to pass through the enclosure includes causing the conveyor belt to enter the enclosure through the entrance and exit the enclosure through the exit, and the belt cleaner further includes a third baffle located adjacent the exit, the method further comprising redirecting airflow from the air nozzle with the third baffle.

21. The method of claim 16, wherein the enclosure has an entrance and an exit, causing the conveyor belt to pass through the enclosure includes causing the conveyor belt to enter the enclosure through the entrance and exit the enclosure through the exit, the first baffle is located between the air nozzle and the entrance, and directing air onto the underside of the conveyor belt includes directing air toward the first baffle with the air nozzle.

22. The method of claim 12, further comprising redirecting airflow from the air nozzle toward the outlet with the first baffle.

23. The method of claim 12, wherein the enclosure has a funnel extending upward from the outlet, the method further comprising funneling airflow from the air nozzle toward the outlet with the funnel.

24. The method of claim 12, wherein causing the residue food material to pass through the outlet is accomplished without a suction system.

* * * * *